United States Patent Office 3,472,816
Patented Oct. 14, 1969

---

3,472,816
PREPARATION OF PLASTICS FROM POLYHYDRIC ARALIPHATIC ALCOHOLS
Josef Baltes, Hamburg, Friedrich Weghorst, Hamburg-Harburg, and Zdzislaw Makus, Bavaria, Germany, assignors to Harburger Fettchemie Brinckman & Mergell, G.m.b.H., Hamburg-Harburg, Germany, a corporation of Germany
No Drawing. Continuation-in-part of application Ser. No. 386,083, July 29, 1964. This application Feb. 16, 1967, Ser. No. 616,483
Claims priority, application Germany, Aug. 3, 1963, H 49,900
Int. Cl. C08g 22/16, 30/10
U.S. Cl. 260—77.5                          1 Claim

---

ABSTRACT OF THE DISCLOSURE

Epoxy reaction products having improved electrical characteristics and polyurethanes having improved stability may be prepared by reacting a polyhydric araliphatic alcohol with polyepoxides on the one hand, and polyisocyanates on the other. The polyhydric araliphatic alcohol must possess the following characteristics: contain at least two residues of fatty alcohol of 16–24 carbon atoms in the carbon chain each chain terminating in a primary alcohol group, each of the said chains being linked by an aromatic nucleus, the alcohol having an hydroxyl number of from 120–180 and an average molecular weight of 500–1000.

---

This is a continuation-in-part of the application of Baltes et al., Ser. No. 386,083, filed July 29, 1964, now abandoned.

The present invention relates to the use of polyhydric araliphatic alcohols for preparing plastics according to the polyaddition process.

The preparation of plastics from polyisocyanates and higher molecular compounds containing reactive hydrogen atoms according to the isocyanate polyaddition process is well known. It is also known that the properties of the plastics may be varied within wide limits, depending upon the type and the proportions of the starting materials, as well as upon the conditions which maintain during the polyaddition reaction.

The alcoholic compounds which are now used are prepared by the esterification of polycarboxylic acids with lower molecular weight polyhydric alcohols which contain free hydroxyl groups. Higher molecular weight polyether-alcohols such as polyethylene glycols and polypropylene glycols are also suitable as well as further ethoxylation or propoxylation products from lower molecular weight polyhydric alcohols, carboxylic acids, amines, and alkanolamines. These compounds are characterized by containing, in addition to their reactive hydroxyl groups, further oxygen-containing groups such as esters, ether, or amide groups which, due to their polar character, have partly a favorable and partly an unfavorable effect on the properties of the polyaddition products.

Another technically important polyaddition process for preparing plastics is the so-called "hardening" of epoxy resins with compounds containing reactive hydrogen atoms such, e.g. as phenols, amines, and amide-amines. Polyalcohols have also been employed for the hardening of epoxy resins. However, in this case, the polyaddition reaction takes place only at higher temperatures or under the influence of basic or acid catalysts and, so far as applicants are aware, the products of this last reaction have found little commercial use.

We have discovered that polyaddition compounds based either on the addition of polyisocyanates or polyepoxides which have different, and in many instances markedly superior, properties to those now known may be obtained by reacting either an isocyanate or an hardenable epoxy resin with a polyhydric araliphatic alcohol—and more specifically such an alcohol having an average molecular weight of 500 to 1000 and an hydroxyl number of 120 to 180.

The nature and the manufacture of the araliphatic carboxylic acids used as starting materials in the present process have been disclosed by the present applicants in their United States Patent 3,271,432, dated Sept. 6, 1966.

The conversion of the polybasic araliphatic carboxylic acids to their respective primary alcohols may be accomplished by conventional hydrogenation procedures if hydrogenation is conducted under such conditions that the ester groups are completely converted into primary alcohol groups and the phenyl groups are maintained.

As our patent (supra) states, the araliphatic polycarboxylic acids are derived from conjoint fatty acids and/or their derivatives such as eleostearic acid, licanic acid, dehydrogenated castor oil fatty acid, isomerised linoleic acid, isomerised linolenic acid, isomerised poly-ene fatty acids of the oils from marine animals, and mixtures of these with saturated and nonconjugated unsaturated fatty acids which have been ionically copolymerized with styrene and its homologues, e.g. alpha methylstyrene or vinyl toluene.

The esters of these acids formed with monohydric alcohols having 1–4 carbon atoms in the molecule and preferably the methyl esters, are particularly suitable as starting materials because any esterified portion which has escaped polymerization can be removed by distilling the reacted mass under mild conditions. Fats and oils which contain the aforementioned fatty acids in the combined form such as wood oil, oiticica oil, dehydrogenated castor oil, and isomerised oils such as soy bean oil, cotton seed oil, sunflower oil, safflower oil, corn oil, linseed oil, perilla oil, and oils from marine animals, in the form of esters with monohydric alcohols containing from 1–4 carbon atoms are also suitable.

These materials are copolymerized with styrene and its homologues in the presence of catalysts which act as proton donors and preferably also in the presence of an inhibitor for free-radical type polymerizations, e.g. hydroquinone or butyl pyrocatechol. The reaction is maintained in the temperature range of from 80–150° C. and preferably at the close of the reaction is conducted at 180° C.

Products obtained by the patented process are liquids of differing viscosities and do not crystallize. Their general structural principle is based on at least two molecules of conjoint fatty acid linked together through one or more molecules of the aromatic vinyl compound. Their main carbon chains end, in each case, in a carboxyl group, while the aromatic groups as well as alkyl or alkylene radicals are present as side chains. In this, they are essentially different from the hitherto known styrolized fatty acids.

The polybasic araliphatic carboxyl compounds are prepared by subjecting a conjugated unsaturated fatty acid compound selected from the class of conjugated unsaturated fatty acid and $C_1$ to $C_4$ alkanol esters of the said acids to ionic copolymerization with an aromatic vinyl compound selected from the class consisting of styrene, alpha methyl styrene and vinyl toluene in the proportions of 1 mol of fatty acid compound to 0.2 to 5 mols of aromatic vinyl compound and controlling the temperature of the reacting mass to prevent the mass temperature from exceeding at any time a temperature of about 200° C.

In carrying out this invention, the acids themselves may be utilized, but we have found it advantageous to utilize not the acids but their esters of monohydric alcohols having 1–4 carbon atoms (for details see the patent supra).

It is also advantageous not to remove whatever unreacted fatty acid esters exist in the final product such as, i.e. palmytoleic acid ester and oleic acid ester. The particular advantage is that that the hydrogenation of the araliphatic polycarboxyl ester can then be made without the addition of a diluent. The unreacted esters can easily be distilled off under high vacuum after the hydrogenation reaction as their respective alcohols.

The preferred procedure therefore is to hydrogenate the complete reaction product from the reaction of unsaturated fatty acids and styrene, and to use no diluent. But it is possible, in the hydrogenations, to use either the complete reaction product of styrene and fatty acid ester or to use the pure araliphatic carboxyl ester after distilling off the normal fatty acid esters and to hydrogenate only the residue. In the latter case, however, in order to achieve a smooth hydrogenation reaction, it is necessary to use a diluent such as, e.g. n-octonnol in the ratio of 1 part of diluent to one part of the acid ester. If the whole product of the styrene reaction is used, the normal fatty acid esters are converted to the respective $C_{16}$ and $C_{18}$ fatty alcohols. After hydrogenation these are distilled at a vacuum of 0.5 mm. Hg at a bottom temperature of 250–260° C. A typical example of the entire process for making polyhydric araliphatic alcohol follows.

EXAMPLE I 150 parts by weight of isomerised safflower fatty acid methyl ester with a content of 65% isomerised linoleic acid methyl ester having a saponification number of 196 was mixed with 35 parts of styrene and 0.2 part of an inhibitor for free radical type reactions, namely butyl pyrocatechol; then 2½ parts of acid-activated bleaching earth were added. The mixture was then heated to 120° C. and stirred for 3 hours. Thereafter, the temperature was raised to 180° C. and the mass was maintained at this temperature for one hour at the reduced pressure of approximately 100 mm. Hg. A minor amount of volatile material distilled which consisted mainly of styrene. The remaining product had the following properties:

| | |
|---|---|
| Color (Gardner) | 6 |
| Viscosity—at 20° C. cp | 110 |
| Viscosity—at 50° C. cp | 60 |
| $n_{50}^D$ | 1484 |
| Iodine number | 97.6 |
| Saponification number | 151.6 |

The product was found to contain 0.9% of unsaponifiable matter. To produce the araliphatic alcohol according to this invention, 100 parts by weight of the product obtained above was charged into an autoclave together with 5 parts by weight of pulveried copper chromite Hydrogen at a pressure of 220 atmosphere was charged into the autoclave and the batch was raised to a temperature of 230–240° C. and stirred until the ester number, as determined by sampling techniques, became lower than 10. The catalyst was then removed in known manner, e.g. by filtration, and thereafter the normal fatty alcohols, principally palmityl and stearyl, were removed by thin-layer distillation under a vacuum of 0.5 mm. Hg at a bottom temperature of 180–200° C.

The residue comprising the araliphatic polyalcohols had the following properties:

| | |
|---|---|
| Color (Gardner) | 3 |
| Viscosity at 20° C. poises | 96 |
| Hydroxyl number | 161 |
| Acid number | 0.2 |
| Ester number | 3.2 |

On analysis, the distilled product was found to consist of about 2 parts of palmityl alcohol and 1 part of stearyl alcohol. It solidified at normal temperature. The hydroxyl number of the distillate was 202, the acid number was 0.5, the ester number was 1.4.

As characteristic structure, these polyhydric araliphatic alcohols possess at least two residues of fatty alcohol having 16 to 24 carbon atoms in the carbon chain. Each chain terminates in a primary alcohol group and the said chains are linked by an aromatic vinyl nucleus. They possess an hydroxyl number of from 120 to 180 and have an average molecular weight of 500 to 1000.

When these alcohols are combined, on the one hand with organic polyisocyanates or on the other hand with polyepoxides, the type of reaction which occurs is identical, namely: a polyaddition takes place. The products of these reactions, when compared with the usual polyurethane or epoxy products, show an increased flexibility and extraordinary stability against hydrolytic influence. They exhibit stability in long-time boiling tests, possess an improved resistance against acids, lyes, and other chemicals and, additionally, have excellent electrical characteristics.

We believe that these advantages which flow from the use of the said araliphatic polyalcohols according to this invention may be attributed to the fact that the alcoholic groups of these compounds are exclusively primary but are linked by long hydrophobic groups. Seemingly also, the polar character of the phenyl groups which are present in the alcohol molecule improves their compatibility with whatever organic isocyanate or polyepoxide compound may be employed in the polyaddition procedure.

As has been stated, the hydrogenation of the carboxylic compounds to the alcohols may be accomplished by following known hydrogenation procedures provided that care is taken to convert completely the ester groups. In hydrogenation, copper chromite is a particularly effective catalyst and may be used in concentrations up to 10 weight percent of the carboxylic acid. Concentrations beyond 10% do not appear to increase the effectiveness of the reaction. Five weight percent. of copper chromite is the preferred range.

Generally, the resulting araliphatic polyalcohols are viscous liquids which are water-clear or have a pale yellow color. They do not crystallize. They are insoluble in water, and are completely or partially soluble in most of the known organic solvents. They can be distilled without decomposition at a pressure of 0.1 mm. Hg and can be characterized by their hydroxyl number, their acid number, their ester number, and their viscosity. Obviously, the viscosity and ester number depend upon the mole ratio of the conjoint fatty acid to the aromatic vinyl compound which is used when making the polybasic araliphatic carboxyl acids. The acid number is less than 1.0. The ester number is less than 10. If the mole ratio is 1:1, then the products which are obtained will have an hydroxyl number of 155–165 and the viscosity will be found to lie between 90 and 100 poises at 20° C.

Polyurethanes are formed by addition reaction of the said alcohol with organic polyisocyanates, and, in this reaction, the novel alcohol may be the sole polyhydric alcohol employed. However, conventional polyhydric alcohols can be added, the novel alcohol being from 5–100% of the total alcohols by weight. The addition reaction proceeds with simple organic polyisocyanates—e.g. toluylene-2,4- and toluylene-2,6-diisocyanate, p̄- and m-phenylene-diisocyanate and higher molecular polyisocyanates obtainable by reaction of simple polyisocyanates with polyalcohols such as trimethylol-propane. Triisocyanates may also be employed. For retarding the addition polymerisation, as is desirable, e.g., in lacquer compositions based on polyurethanes, the so-called masked polyisocyanates can be used. These are obtained by reaction of simple diisocyanates with monohydroxy compounds such as aliphatic alcohols and phenols at elevated temperature.

The polyurethanes which result may be given any of the forms of modern technology. The products may be solid elastomers, surface coatings, or foams—depending upon the proportions of the reactants and the additives which are employed. The products may be molded, sprayed, or foamed by known techniques. Generally it is preferable to mix all additives, i.e. catalysts, emulsifying agents, blowing agents, or fillers, with the polyalcohol as one component and, when reaction is desired, add the polyisocyanate. The conventional amine catalysts, the conventional emulsifying agents, e.g. the alkyl phenol polyglycol ethers and the usual fillers—chalk, barytes, $SiO_2$, etc.—may be employed as is known in the art.

The araliphatic polyalcohols can be reacted with epoxy compounds having a 1, 2 epoxy equivalency of greater than 1, such as those shown in the Whittier et al. Patent No. 2,765,288.

The reaction of the araliphatic polyalcohols with polyepoxy compounds is very slow at room temperature, but it can be accelerated by acid or by basic catalysts and preferably in the presence of tertiary amines or ammonium hydroxide. Surprisingly also polyamide amines of dimeric fatty acids having 36–54 carbon atoms, or araliphatic polycarboxylic acids usually employed for hardening epoxy resins act in the same sense. Mixtures of 5–80 parts of the araliphatic polyalcohols and from 20–95 parts of the said poly-amide amines are excellent hardeners for epoxy resins. These mixtures may be hardened at normal as well as elevated temperature. The amount of araliphatic polyalcohol which thus is incorporated into the resulting composition increases its flexibility and improves as well its resistance to hydrolysis and its stability against chemical attack. The electrical properties of the cured material—in particular its tracking resistance, disruptive strength, resistivity and dielectric behavior—are noticeably improved.

In preparing the epoxy compositions, preferably the diglycidyl ethers containing terminal epoxy groups such as those obtained by the condensation of compounds containing or forming epoxy groups such as epichlorohydrin with polyhydric phenols such as 4,4'-isopropylidene diphenol, are highly suitable. Also hardenable epoxy compounds which are obtained by epoxidation can be used. Such compounds may also contain other reactive groups, e.g. hydroxyl. Monoepoxy compounds may be included.

EXAMPLE II 100 parts by weight of an araliphatic polyalcohol having an hydroxyl number of 162, an average molecular weight of 700 and a viscosity of 100 cps. (at 20° C.) obtained as in Example I, as well as 32.5 parts by weight of distilled diphenyl-methane-4,4$^1$-di-isocyanate were degassed in a vacuum of 10 mm. Hg at ambient temperature and subsequently mixed by means of a stirring device. When homogeniety of the mixture was obtained, 0.4 part by weight of a stannous octoate were quickly added and the composition was poured into a suitable container. Gelling occurred after 1 minute and the product was cured with spontaneous increase of temperature within 4 to 5 minutes resulting in the formation of a rubber-like mass. Flexibility and mechanical properties of the product were not markedly changed after 2 weeks storage in a steam-saturated atmosphere at 60° C. In boiling water, the material was stable for several days. In another experiment, the mixture was sprayed by means of a spray gun on sandblasted sheet iron specimens and was cured within 25 minutes to a lustrous, firmly adhering coating. The coating withstood continuous bending tests without damage.

EXAMPLE III 26.2 parts by weight of the araliphatic polyalcohol used in Example II, 13.1 parts by weight of a mixture of palmityl alcohol and stearyl alcohol (1:2), 39.3 parts by weight of polypropylene glycol having an hydroxyl number of 56 and an average molecular weight of 3000, 6.7 parts by weight of butylene glycol and 1.4 parts by weight of cobalt naphthenate, dissolved in 4.7 parts by weight of a mixture of aromatic compounds were mixed and dehydrated for ½ hour under a vacuum of 10 mm. Hg. 100 parts by weight of this mixture were then mixed with 54 parts by weight of diphenylmethane-4,4$^1$-di-isocyanate by means of a stirring device and poured into containers. After 90 seconds, gelling occurred, and after 20 minutes the mixture showed a dust-dry, shining surface. The mass was cured within 24 hours. At 80° C., curing required 2 hours.

The product showed an increase flexibility as compared to the product described in Example II but was equal to the product of Example II as regards resistance to water and mechanical strength.

EXAMPLE IV 65 parts by weight of the araliphatic polyalcohol used in Example II and 75 parts by weight of a polyamide amine having an amine number of 275 which was obtained by condensing 7.6 parts by weight diethylene triamine and 24 parts by weight of a copolymer from isomerised soya oil fatty acid methyl ester and styrene were mixed manually. At room temperature, a fully homogeneous mass was formed within 10 minutes. To this mixture, 5 parts by weight of triethanolamine and then 100 parts by weight of an epoxy resin, obtained by alcoholic condensation of epichlorohydrin and 4,4'-isopropylidene diphenol (Bisphenol A), were added with stirring. The epoxy resin had the following characteristics: liquid at normal temperature, 2 epoxy groups per molecule, 0.3 hydroxyl group per molecule, average molecular weight about 380. After admixture of the epoxy resin, the mass was clear and homogeneous within a few minutes. Gelling occurred after 4 hours and the mass was cured with increase of temperature within 6 to 7 hours. At 90° C., the curing time was 15 minutes.

A fully homogeneous and fully transparent, non-meltable resin of high impact resistance was obtained. The same material, when painted between two sandblasted sheet iron specimens and cured at 90° C. resulted in a very strong adhesive connection. The crude product was highly stable in hot water, lye and dilute acids.

EXAMPLE V

An araliphatic polyalcohol obtained by the reaction of 330 parts by weight of isomerized soy oil fatty acid methyl ester and 64 parts of styrene reacted under similar conditions to those set forth in Example I and hydrogenated to the alcohol with copper chromite catalyst under a hydrogen pressure of 200–250 atmospheres at 280–300° C. having an hydroxyl number of 150 and a viscosity of 105 poises at 20° C. was intimately mixed with 15 parts by weight of chalk and 0.8 part by weight of ethoxylated nonylphenol (ca. 8 molecules ethylene oxide per phenyl group), 2 parts by weight of water, and 1.3 parts by weight of triethylamine. After thoroughly mixing, 50 parts by weight of crude diphenylmethane 4,4'-diisocyanate were added, vigorously stirred and the mass immediately poured into a mold. In 50 seconds, a foamy product formed which became strong enough to permit removal from the mold in 5 minutes. The foam product had a density of 60 kg./m.$^3$. It exhibited a fine porous structure and was slightly elastic. Samples stored respectively for 2 weeks in water and for 2 weeks in a steam-saturated atmosphere at 60° C. were fully stable.

EXAMPLE VI 70 parts by weight of a polyamide amine, having an amine number of 270 which was obtained by condensing dimeric fatty acids with diethylene triamine, 30 parts by weight of the araliphatic polyalcohol used in Example II, and 5 parts by weight of 2,4,6--tri-(di-amino-methyl)-phenol were mixed. A homogeneous mass was obtained upon heating only to 40° C. with occasional stirring. Homogeneity occurred within ½ an hour. The above product was then mixed with 100 parts by weight of 4,4'-isopropylidene diphenol (Bisphenol A) and epichlorohydrin. Gelling occurred after 5 hours, and the mass cured with a slight temperature increase within 10–12 hours. The same mass cured in an oven maintained at 90° C. in 30 minutes. The characteristics of the product were similar to those obtained in Example II.

What is claimed is:

1. A resinous composition comprising the addition polymerization reaction product of a polyhydric araliphatic alcohol and an organic polyisocyanate, the said alcohol possessing the following characteristics:
   (a) at least 2 residues of a fatty alcohol having 16–24 carbon atoms in the carbon chain,
   (b) each chain terminating in a primary alcohol group,
   (c) linking of the said chains being secured by an aromatic vinyl nucleus,
   (d) an hydroxyl number of from 120–160, and
   (e) an average molecular weight of 500–1000, said alcohol having been prepared by hydrogenating a carboxyl compound prepared by subjecting a conjugated unsaturated fatty acid compound selected from the class of conjugated unsaturated fatty acid and $C_1$ to $C_4$ alkanol esters of the said acids to ionic copolymerization with an aromatic vinyl compound selected from the class consisting of styrene, alpha methyl styrene and vinyl toluene in the proportions of 1 mole of fatty acid compound to 0.2 to 5 moles of aromatic vinyl compound and controlling the temperature of the reacting mass to prevent the mass temperature from exceeding, at any time, a temperature of about 200° C.

References Cited

UNITED STATES PATENTS

| 3,378,531 | 4/1968 | Heins et al. | 260—77.5 |
| 3,288,730 | 11/1966 | Baltes et al. | 260—23 X |
| 3,271,432 | 9/1966 | Baltes et al. | 260—407 |

DONALD E. CZAJA, Primary Examiner

C. W. IVY, Assistant Examiner

U.S. Cl. X.R.

260—2.5, 18, 830, 47